United States Patent [19]
Watanabe et al.

[11] Patent Number: 5,917,172
[45] Date of Patent: *Jun. 29, 1999

[54] APPARATUS AND METHOD FOR BAR CODE READING

[75] Inventors: Mitsuo Watanabe; Ichiro Shinoda, both of Kawasaki, Japan

[73] Assignee: Fujitsu Limited, Kawasaki, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/509,585

[22] Filed: Jul. 31, 1995

[30] Foreign Application Priority Data

Aug. 5, 1994 [JP] Japan .................................. 6-184839

[51] Int. Cl.⁶ ............................................ G06K 7/10
[52] U.S. Cl. .............................. 235/462.12; 235/462.01
[58] Field of Search .......................... 235/462, 462.12, 235/462.01

[56] References Cited

U.S. PATENT DOCUMENTS 4,973,829 11/1990 Ishida et al. ......................... 235/462
5,466,921 11/1995 Lapinski et al. ..................... 235/462

FOREIGN PATENT DOCUMENTS 0 262 924 4/1988 European Pat. Off. .

*Primary Examiner*—Donald T. Hajec
*Assistant Examiner*—Karl Frech
*Attorney, Agent, or Firm*—Nikaido, Marmelstein, Murray & Oram LLP

[57] ABSTRACT

When bar code data of a left or right block flanked by a guard bar and a center bar is input, several characters including the first character are demodulated, and a decision is made as to whether demodulation should be continued or not. If demodulation has already been performed a specified number of times, or demodulation free from significant distortion has already been performed, on the block currently subjected to demodulation, the demodulation process is discontinued and demodulation is not performed on the remaining characters.

10 Claims, 9 Drawing Sheets

43

APPARATUS AND METHOD FOR BAR CODE READING

BACKGROUND OF THE INVENTION

1. Field of the Invention

The present invention relates to an apparatus and method for bar code reading, wherein the surface of an object on which a bar code is carried is scanned in raster fashion and the bar code is read using the reflected light.

2. Description of the Related Art

A bar code symbol, defined by the Universal Product Code (UPC), contains guard bars placed at both edges of the bar code and center bars placed at the center. A bar code encoding a 6- or 4-digit number (6 or 4 characters) is placed between the left guard bars and the center bars (the left block), and a bar code encoding the same number of characters is placed between the right guard bars and the center bars (the right block).

The surface of an object carrying a bar code is scanned in raster fashion to read the bar code. In scanning, if the bar code is placed with its vertical bars oriented substantially perpendicular to the direction of scanning, the left and right blocks can be scanned with one scan line and all the characters represented in both blocks can be demodulated from the data obtained from the one scan line. However, in an actual operating environment, it is not possible to demand that the direction of scanning be always perpendicular to the bars. In actual systems, to enable demodulation even when the bar code is placed over the scanning system at such an angle that the left and right blocks cannot be scanned simultaneously with one scan line but can be scanned with separate scan lines in different paths, provisions are made so that the left and right blocks are demodulated separately and the demodulation is complete after demodulating both blocks. In such systems, however, if the inclination of the bars is large, after first detecting one block a number of scans is required before the other block can be detected. In such cases, a large volume of unprocessable data is stored in a buffer, since the speed of demodulation is generally slower than the speed of scanning. Therefore, when the inclination of the bars is large, the time from the beginning of detection to the completion of demodulation becomes long because of the time taken to process a large volume of unprocessable data, the resulting problem being a slow system response. If the buffer capacity is reduced to reduce the amount of storable unprocessable data, this will in turn lead to a failure to capture necessary data, which also causes a slow response.

SUMMARY OF THE INVENTION

It is an object of the present invention to provide a bar code reading apparatus and method that can ensure quick response regardless of the direction of the bar code.

According to the present invention, there is provided an apparatus for reading a bar code, consisting of a plurality of code blocks each representing a plurality of characters, comprising: input means for inputting one of the plurality of code blocks; first demodulating means for demodulating from the input code block a prescribed number of characters out of the plurality of characters represented by the code block; continuation deciding means for deciding whether to continue or discontinue demodulation, based on the prescribed number of characters demodulated by the first demodulating means and on already demodulated characters; second demodulating means for demodulating the remainder of the plurality of characters only when the continuation deciding means has decided that demodulation must be continued; and repeating means for repeatedly activating the input means, the first demodulating means, the continuation deciding means, and the second demodulating means until demodulation is completed for all of the code blocks.

According to the present invention, there is also provided a method of reading a bar code consisting of a plurality of code blocks, each representing a plurality of characters, comprising the steps of: a) inputting one of the plurality of code blocks; b) demodulating from the input code block a prescribed number of characters out of the plurality of characters represented by the code block; c) deciding whether to continue or discontinue demodulation, based on the prescribed number of demodulated characters and on already demodulated characters; d) demodulating the remainder of the plurality of characters only when it is decided in step c) that demodulation must be continued; and e) repeating steps a)–d) until demodulation is completed for all of the code blocks.

DESCRIPTION OF THE PREFERRED EMBODIMENTS

Figure 1:
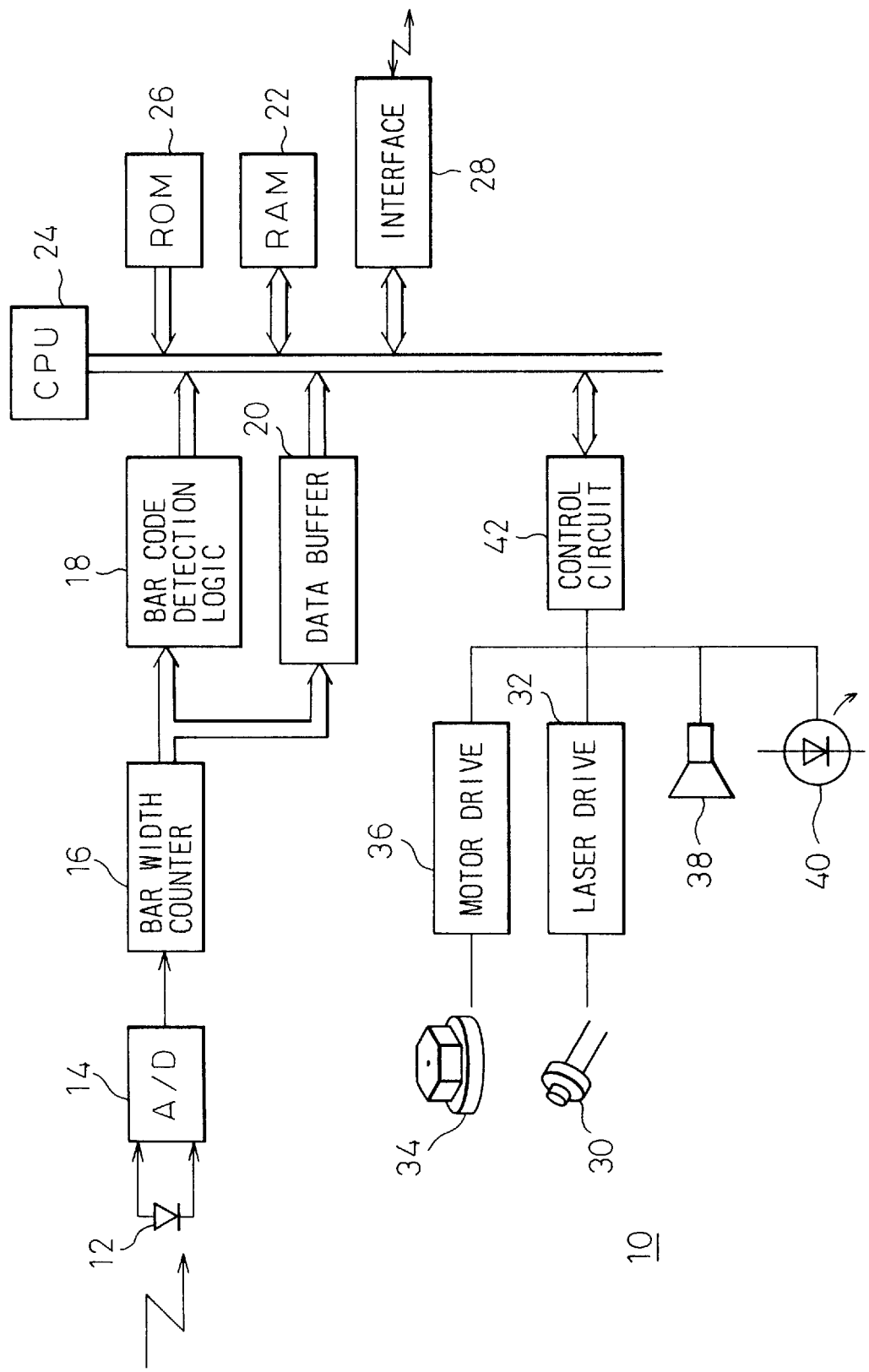
FIG. 1 is a block diagram of a bar code reading apparatus according to one embodiment of the present invention.

FIG. 1 shows a block diagram of a bar code reading apparatus according to one embodiment of the present invention. As shown in FIG. 1, the bar code reading apparatus 10 of this embodiment comprises: a photodetector 12 for receiving light reflected from a bar code; an A/D converter 14 for converting the received analog signal into a digital signal; a bar width counter 16 for measuring bar width and bar spacing; a bar code detection logic 18; a data buffer 20 for holding a set of bar width data; a random-access memory 22 for storing demodulated data, etc.; a central processing unit 24; a read-only memory 26 for holding programs; an interface 28 for controlling connection with a communication line; a semiconductor laser 30 for emitting a laser beam for scanning a bar code; a laser driver 32 for driving the semiconductor laser; a polygon mirror 34 which is rotated to direct the laser beam to scan a bar code; a motor driver 36 for driving the polygon mirror 34 for rotation; a speaker 38 for sounding an alarm in the event of error occurrence; an LED light-emitting element 40 for indicating status on an operation panel or the like; and a control circuit 42 for controlling the laser driver 32, the motor driver 36, the speaker 38, and the LED light-emitting element 40.

The bar width counter 16 evaluates the value of the digital data fed from the A/D converter 14, judges whether the data represents a bar or a space, and based on the judgement, counts clock pulses to continuously measure the bar width and the bar spacing. Measured values from the bar width counter 16 are sequentially stored in the data buffer 20. When the data buffer 20 becomes full, no further data is stored until a direction is given from the CPU 24. The bar code detection logic 18 detects left or right guard bars and center bars from the output of the bar width counter 16, and appends flags to the data stored in the data buffer 20, indicating the positions of the guard bars and center bars, while notifying the CPU 24 accordingly. The detection of the guard bars and center bars by the bar code detection logic 18 can also be implemented by the CPU 24 performing processing in accordance with a program stored in the ROM 26.

Figure 2:
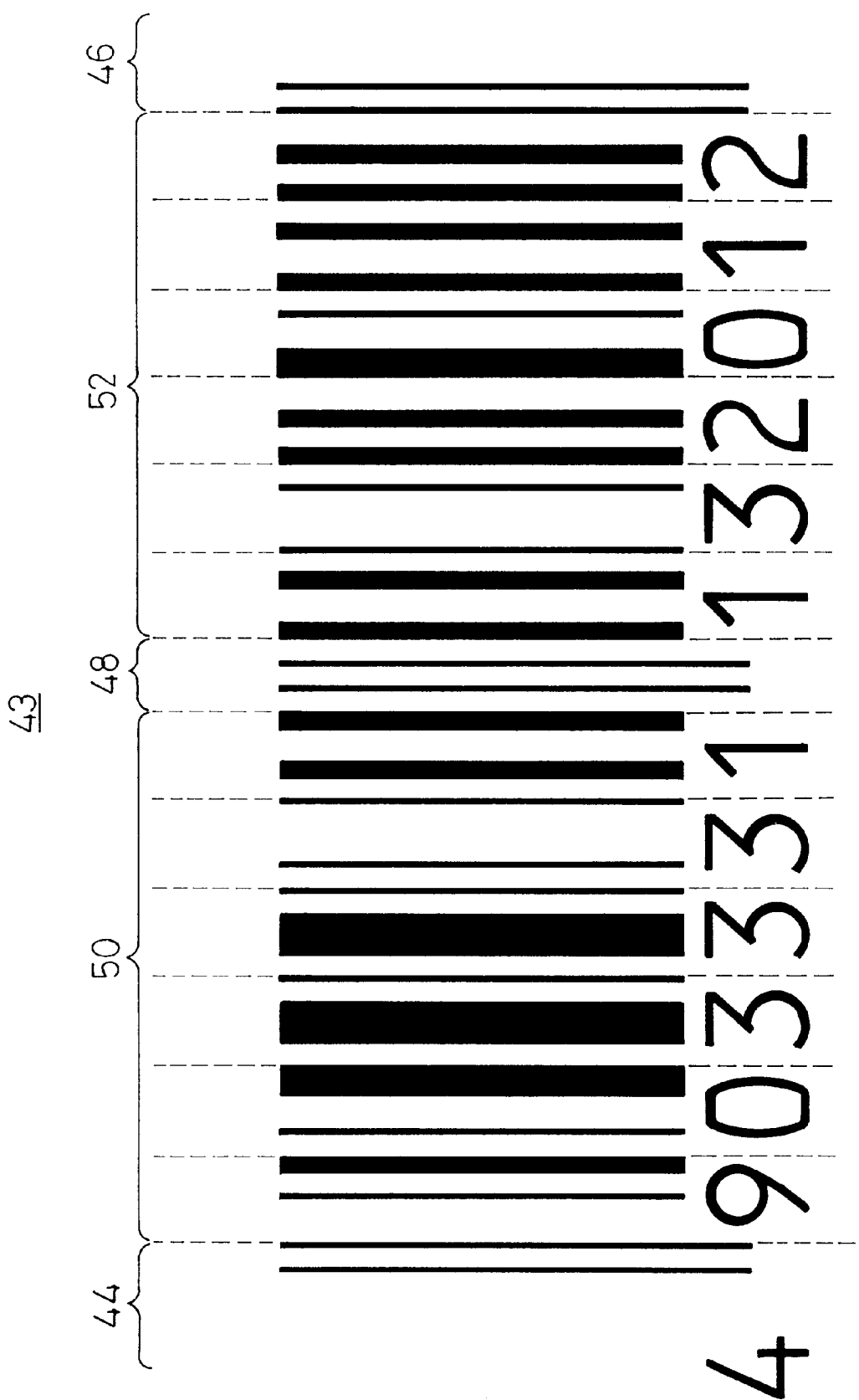
FIG. 2 is a diagram showing an example of a bar code.

FIG. 2 shows an example of a bar code defined by the UPC. Left guard bars 44, right guard bars 46, and center bars 48 are placed at the left and right edges and at the center of the bar code 43, respectively. A bar code encoding a 6-digit (or 4-digit) number is placed between the left guard bars 44 and the center bars 48. This bar code is hereinafter referred to as the left block. Likewise, a bar code encoding a number composed of the same number of digits is placed between the right guard bars 46 and the center bars 48. This bar code is hereinafter referred to as the right block.

Figure 3A:
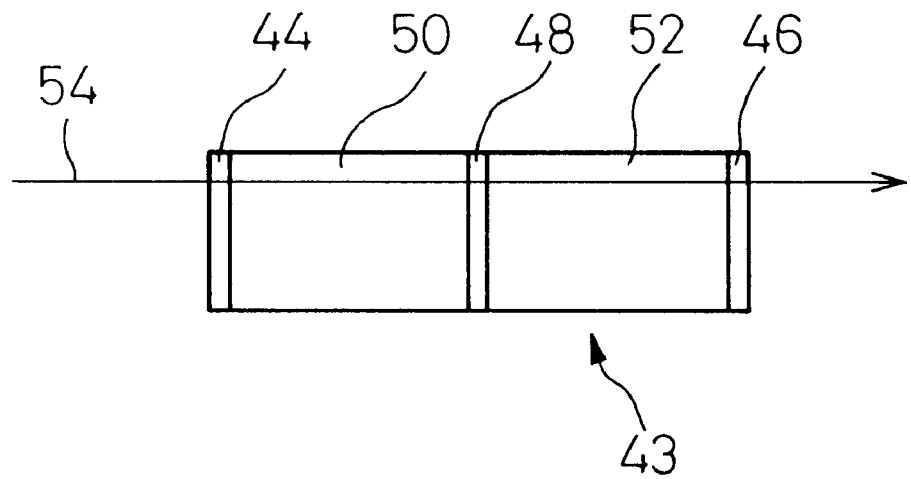
FIGS. 3A and 3B are diagrams for explaining modes of bar code scanning.
Figure 3B:
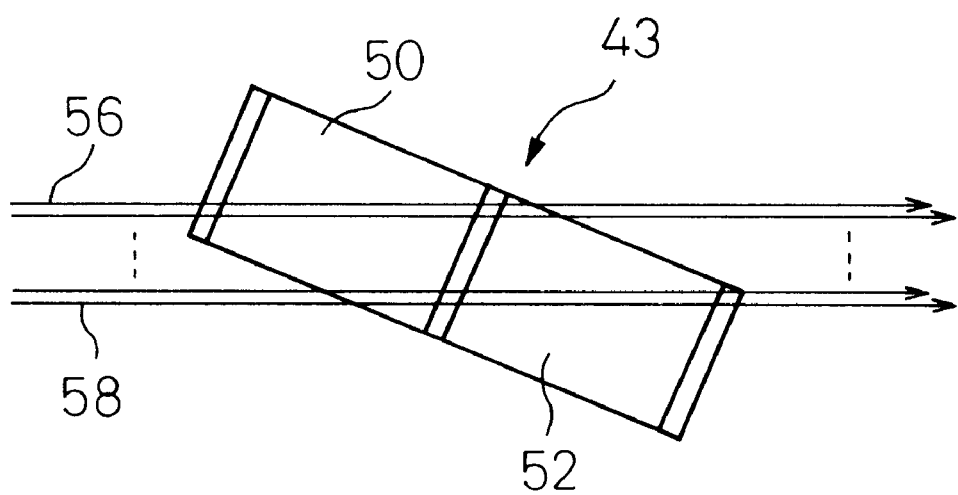

When the bar code is placed with the bars oriented perpendicular to the direction of scanning, as shown in FIG. 3A, the data of the left block 50 and right block 52 can be simultaneously demodulated from the data obtained from a single scan line 54. On the other hand, when the bar code is placed at an angle, as shown in FIG. 3B, a number of scans are required between a scan line 56, the first scan line that can effectively scan the left block 50 between the left guard bars 44 and the center bars 48 for demodulation, and a scan line 58, the first scan line that can effectively scan the right block 52 between the right guard bars 46 and the center bars 48 for demodulation. In the prior art, when one block was detected, the CPU 24 performed demodulation on all bar width data, in accordance with a program stored in the ROM 26, until the other block was detected. Since the speed of demodulation performed by the CPU 24 is slower than the speed of scanning, in the case shown in FIG. 3B the CPU 24 lags behind in processing and the data buffer 20 becomes full before demodulating the right block and after the demodulation of the left block, resulting in a failure to capture necessary data. This causes a delay in the detection of the right block, leading to a decrease in the system response. To prevent data capture failure, the capacity of the data buffer 20 may be increased so that all data from the scan line 56 to the scan line 58 can be stored, but this will again decreases the response speed since a large amount of stored data has to be processed for demodulation.

Figure 4:
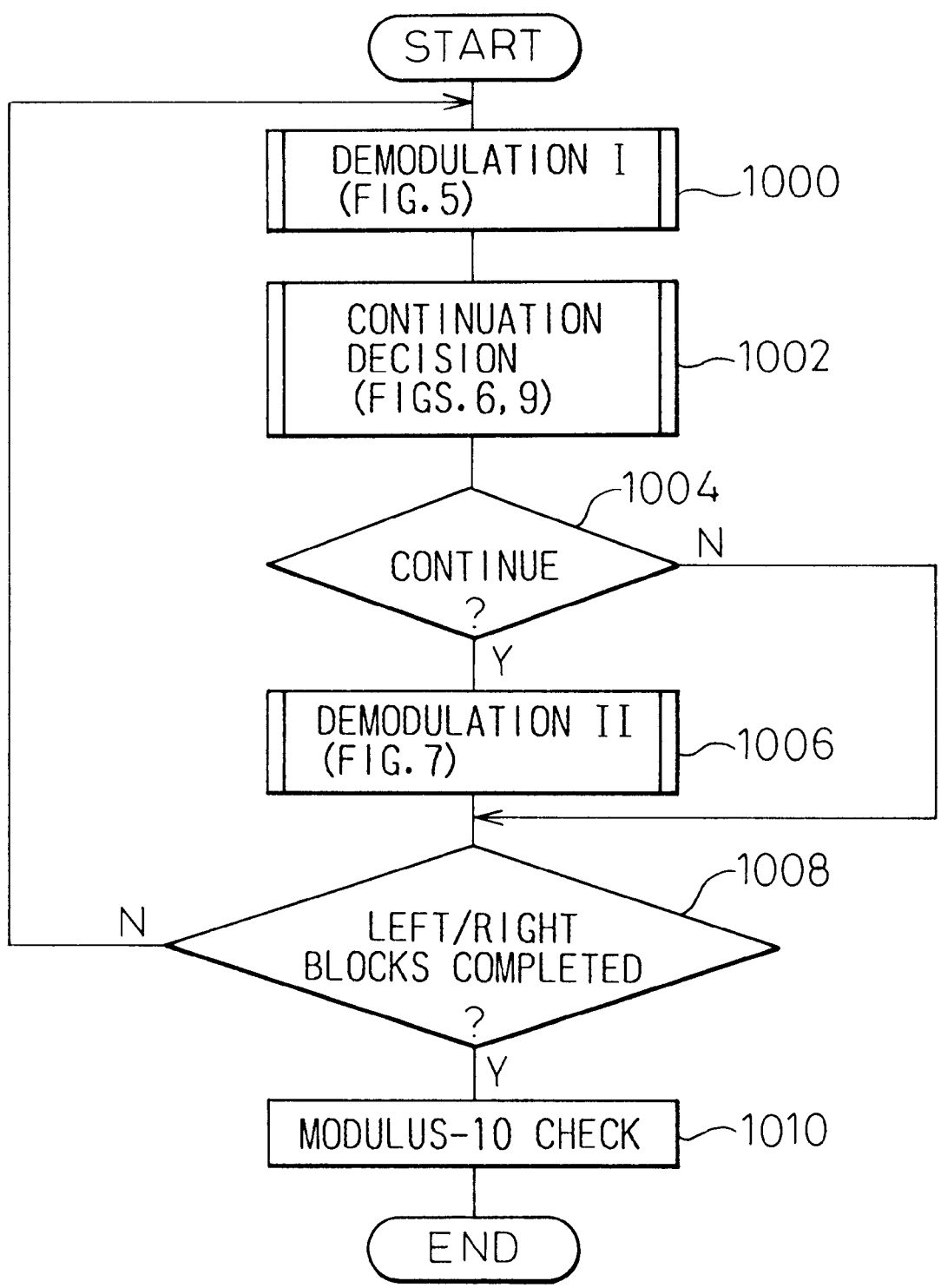
FIG. 4 is a flowchart illustrating the operation of the bar code reading apparatus of the present invention.

FIG. 4 is a flowchart illustrating the processing performed by the CPU 24 in the bar code reading apparatus shown in FIG. 1. First, in step 1000, "DEMODULATION I" is carried out. In DEMODULATION I, of the bar width and bar spacing data intervening between the left or right guard bars and the center bars and stored in the data buffer 20, only designated data of one digit or two digits are demodulated; this process will be described in detail later. Next, in step 1002, a decision is made, based on the data demodulated in DEMODULATION I and on the already demodulated data stored in the RAM 22, as to whether the demodulation process is to be continued or not. The details of this decision process will be described later. If it is decided to continue the demodulation process, data of the remaining digits are demodulated in DEMODULATION II (step 1006). If it is decided not to continue but to stop the demodulation process, DEMODULATION II is skipped. In step 1008, it is determined whether the demodulation of the left and right blocks is completed; if not completed, the process returns to step 1000. If the demodulation is completed, the process proceeds to step 1010 where a modulus-10 check is performed, after which the process is terminated.

Figure 5:
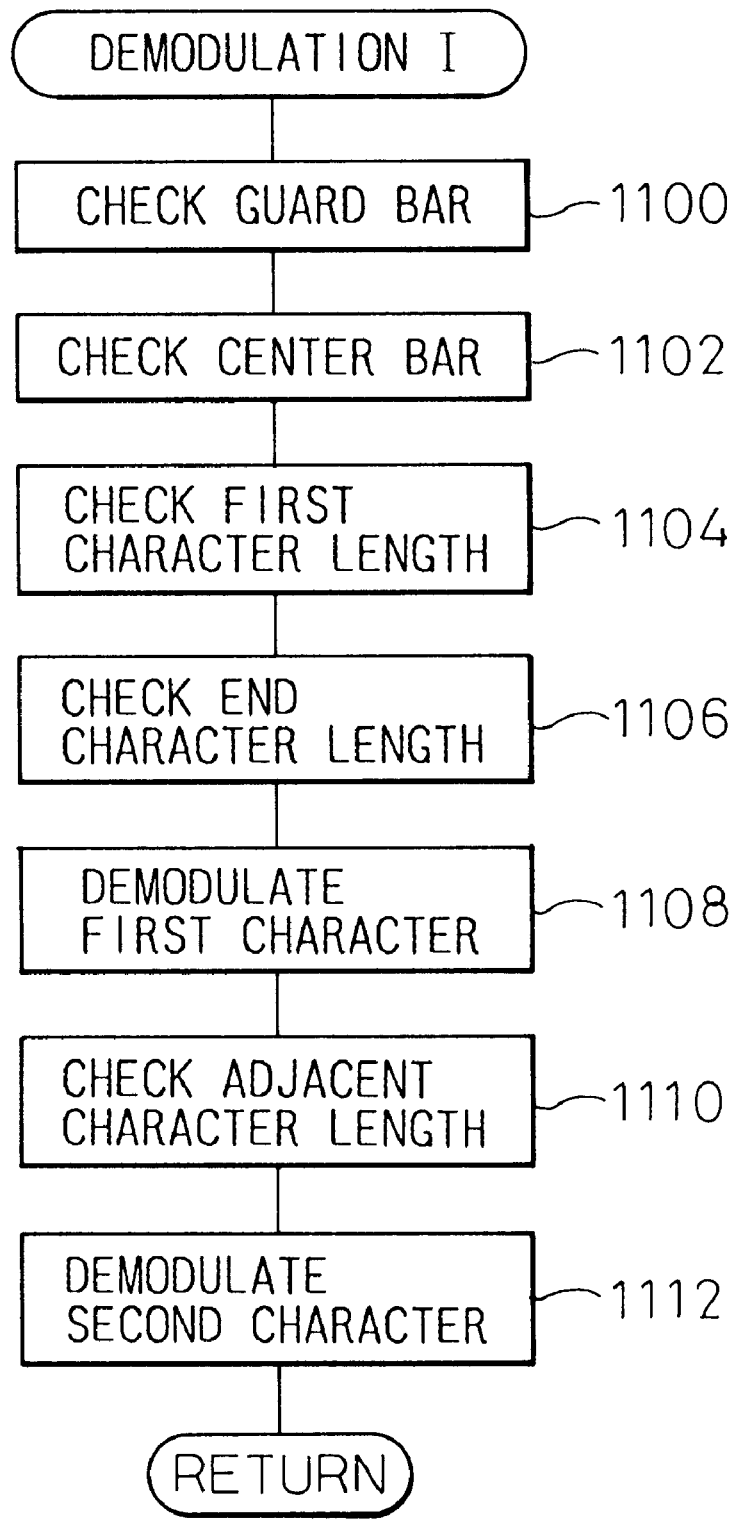
FIG. 5 is a flowchart illustrating the details of a demodulation process I.

FIG. 5 shows in detail one example of DEMODULATION I. In step 1100, the guard bars are detected and are checked to determine whether they satisfy the specified dimensions. In step 1102, the center bars are detected and are checked whether they satisfy the specified dimensions. These processing steps are not needed if the detection of the guard bars and center bars is performed using the bar code detection logic 18 (FIG. 1). If the results of these checks are OK, then in step 1104 it is checked whether the ratio of the length of the region corresponding to the first character, i.e., the character adjacent to the guard bars, to the length of the guard bar region is 7:3 within prescribed tolerance limits, and in step 1106, it is checked whether the ratio of the length of the region corresponding to the end character, i.e, the character adjacent to the center bars, to the length of the center bar region is 7:5. If the results of these checks are OK, the first character is demodulated in step 1108. Next, in step 1110, it is checked whether the ratio of the length of the second character region to the length of the first character region is 7:7, and if the result is OK, the second character is demodulated in step 1112.

In any of the steps 1100, 1102, 1104, 1106, and 1110, if the result is NG, the processing is interrupted and the process returns to step 1000 in FIG. 4. It should also be noted that the processing in steps 1102, 1104, 1106, and 1110 is not necessarily essential. Furthermore, in DEMODULATION I shown in FIG. 5, the first and second characters adjacent to the guard bars are demodulated, but since it is sufficient to demodulate the first character to decide whether to continue or not continue the demodulation process, as will be explained later, steps 1110 and 1112 may be omitted.

The demodulation process is performed in accordance with UPC specifications. That is, for the two bars appearing in each region, their bar widths and the spacing to the adjacent bar are examined, from which the corresponding character and the parity, odd or even, are determined.

Figure 6:
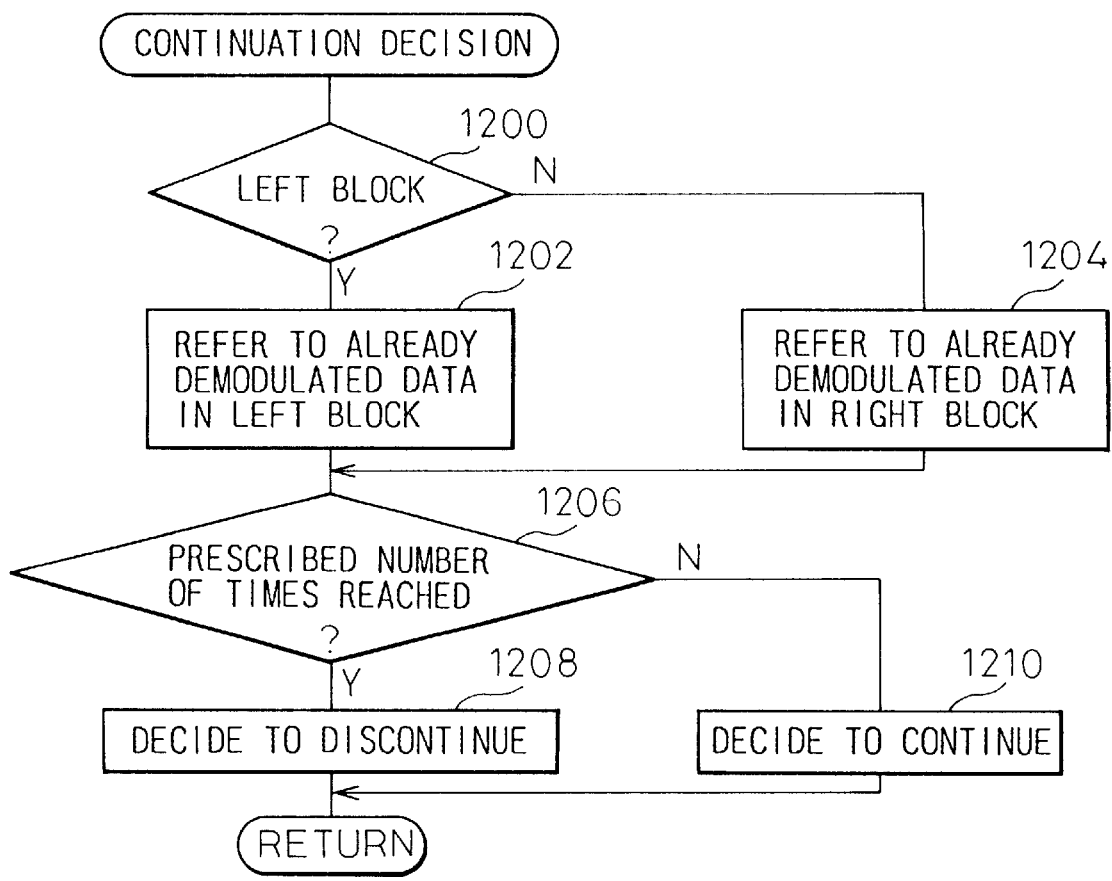
FIG. 6 is a flowchart illustrating one example of a continuation decision process.

FIG. 6 shows in detail a first example of the continuation decision process. In step 1200, a decision is made as to whether the data currently being demodulated belongs to the left block or the right block. According to the UPC specification, all characters in the right block have even parity and the first character in the left block is always in odd parity; therefore, from the parity of the first character, it is determined whether the character belongs to the left block or the right block, which is then verified by comparing it with the already demodulated first character in the left block or right block. When demodulating the second character also, the second character and its parity are compared with those of already demodulated one. If the character belongs to the left block, already demodulated data in the left block is referred to (step 1202); if the character belongs to the right block, already demodulated data in the right block is referred to (step 1204). Then, it is determined whether demodulation has been performed a prescribed number of times on the referred data (step 1206). If demodulation has already been performed the prescribed number of times, then it is decided that the demodulation process should be discontinued (step 1208); on the other hand, if there is no data already demodulated or if there is already demodulated data but the prescribed number of times has not yet been reached, it is then decided that the demodulation process should be continued (step 1210).

The "prescribed number of times" here refers to the number of times that demodulation is performed on the same block of a bar code and that is necessary to ensure read reliability while sufficiently reducing the chance of errors in demodulating data. The number of times should be at least one, and preferably two; as the number of times increases, the chance of error occurrence decreases. The number of times is specified in advance.

Figure 7:
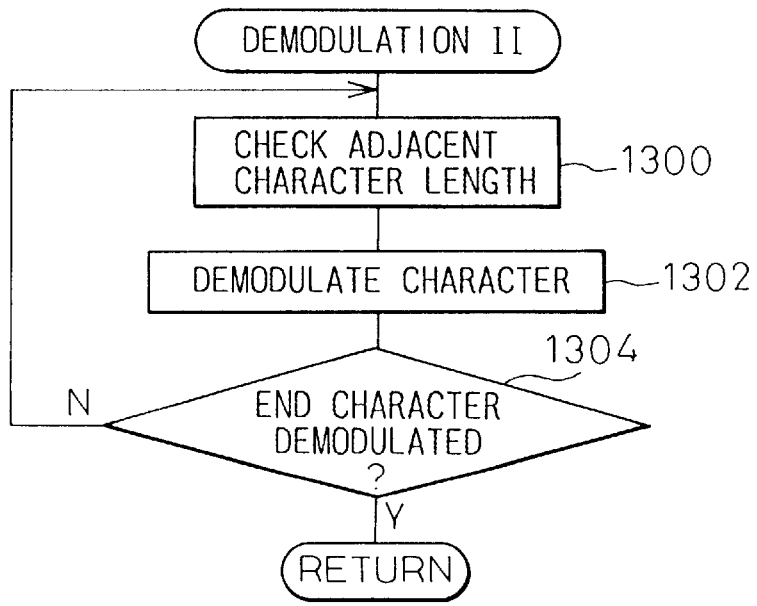
FIG. 7 is a flowchart illustrating the details of a demodulation process II.

FIG. 7 shows the details of DEMODULATION II. In step 1300, it is checked whether the length of the character about to be demodulated is equal to the length of the adjacent character already demodulated within prescribed tolerance limits. If the result of the check is OK, the character is demodulated (step 1302). In step 1304, it is checked whether the demodulation of the end character is completed, and if it is not completed, the process returns to step 1300. As in the earlier described process, if the result of the check in step 1300 is NG, the processing is immediately terminated and the process returns to step 1000 in FIG. 4. The processing in step 1300 is not necessarily essential.

Figure 8A:
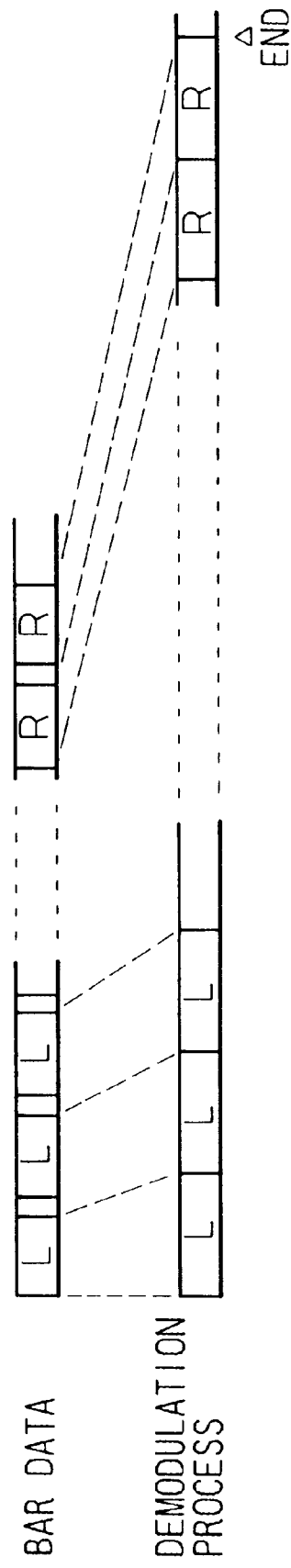
FIG. 8A is a diagram for explaining the performance of a bar code reading apparatus of the prior art.

FIG. 8A is a timing chart illustrating the operation of a prior art bar code reading apparatus for the case of FIG. 3B. In FIG. 8A, the left block is designated by L and the right block by R. In the example shown here, the prescribed number of times is set at "2". In the prior art, since processing was performed on all input bar width data, an appreciable time was spent in processing a large volume of left block data input before the input of the right block data was started, thus taking a considerable time to complete the reading operation, and resulting in a failure to capture necessary data, as mentioned before.

Figure 8B:
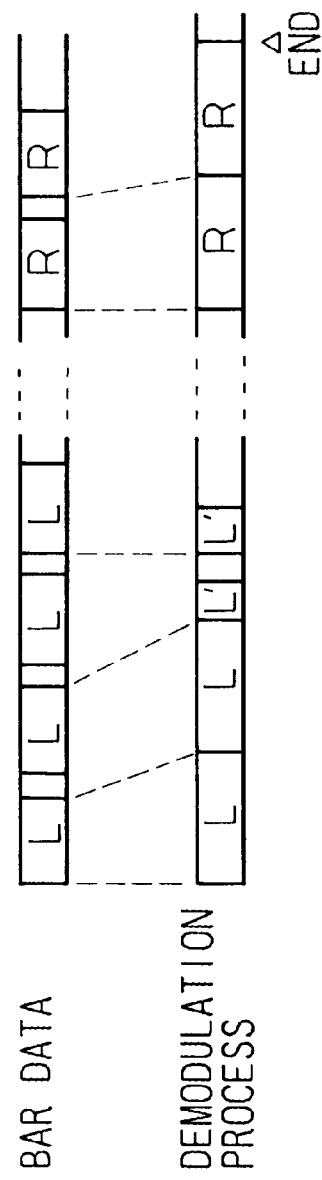
FIG. 8B is a diagram for explaining the performance of the bar code reading apparatus of the present invention.

FIG. 8B is a timing chart illustrating the operation of the bar code reading apparatus according to the present invention for the same case. Since the demodulation process is stopped halfway and not performed on the third and subsequent characters in the left block, there occurs no delay in processing and the reading operation can be completed in a short time.

Figure 9:
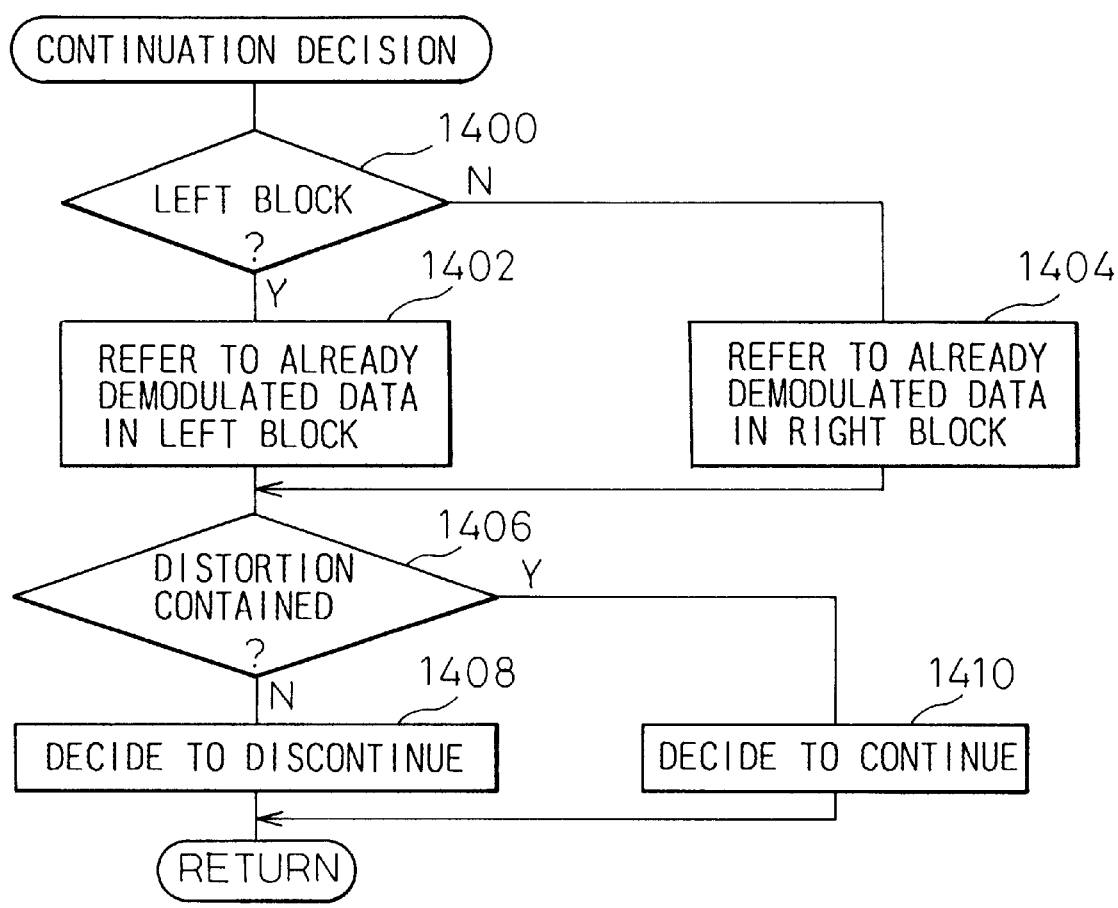
FIG. 9 is a flowchart illustrating another example of the continuation decision process.

FIG. 9 shows in detail a second example of the continuation decision process (step 1002) in FIG. 4. In steps 1400 to 1404, a decision is made on the basis of one or more demodulated characters as to whether the data belongs to the left block or the right block, and based on this decision, already demodulated data is referred to; the processing in these steps is the same as that shown in FIG. 6. Next, in step 1406, it is checked whether the already demodulated data thus referred to contains a significant distortion. If there is no significant distortion, then it is decided that the demodulation process should be discontinued (step 1408); if there is a significant distortion, then it is decided that the demodulation process should be continued (step 1410).

The "distortion" here means a deviation from dimensions specified in the UPC, and includes, for example, the following:

i) Distortion in the ratio (7:7) between the lengths of the bar code regions corresponding to two adjacent characters.

ii) Distortion in delta distance (described later).

iii) Distortion in bar width and bar spacing.

The decision process can be accomplished in various ways: for example, one way is by making a decision with attention focused on only one of the distortions i), ii), and iii), and in another, it is decided that the data contains a significant distortion if there is a significant distortion in any one of i), ii), and iii).

Figure 10:
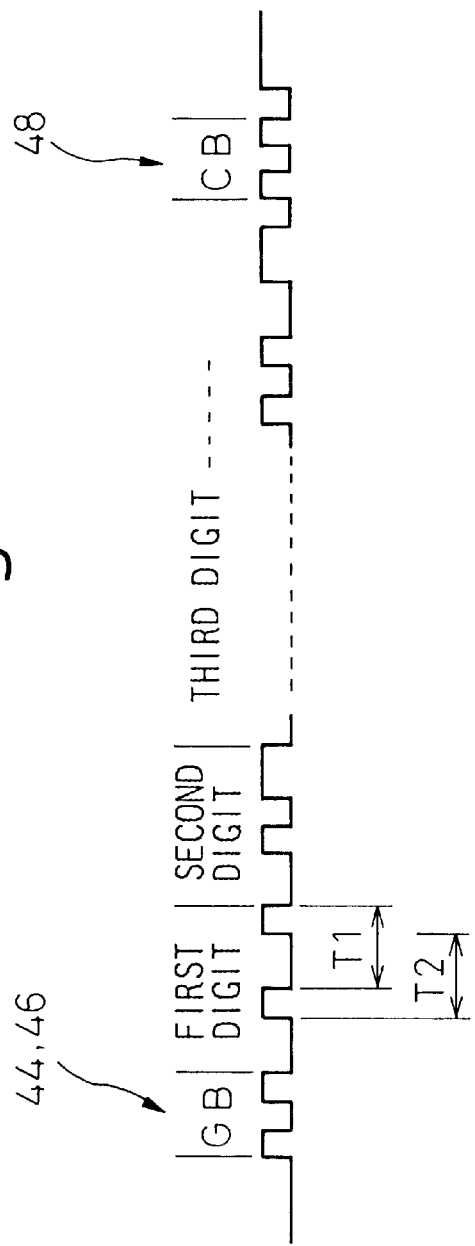
FIG. 10 is a diagram for explaining delta distances T1 and T2.
Figure 11:
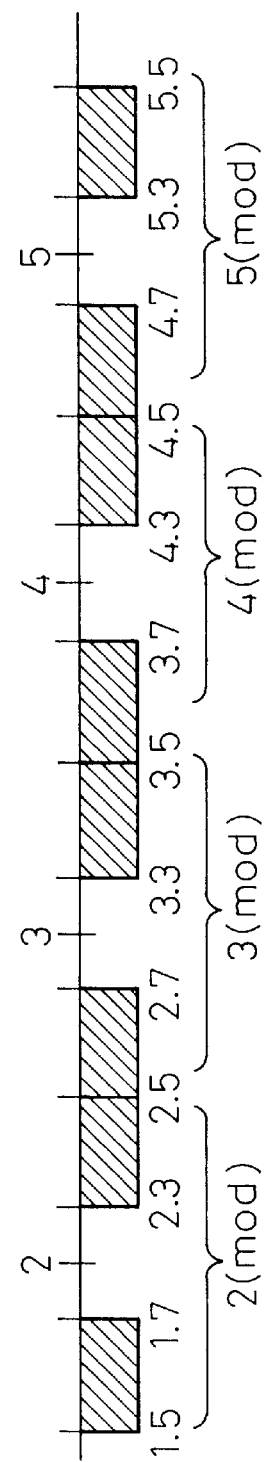
FIG. 11 is a diagram for explaining how distortion is judged based on delta distance.

A further description will be given below by taking the decision based on delta distance ii) as an example. As shown in FIG. 10, the delta distance refers to dimension T1, the distance from the trailing edge of the first bar to the trailing edge of the second bar in a bar code region corresponding to one character, and also to dimension T2, the distance from the leading edge of the first bar to the leading edge of the second bar. Characters can be demodulated using combinations of the delta distance ($T_1$, $T_2$). For example, when $T_1$ is four modules long and $T_2$ is two modules long, "E9" is recognized. The delta distance, T1 and T2, is n modules long (n is an integer between 2 and 5) where one module (=100 counts) is the smallest unit of length. Accordingly, if the length of T1 or T2 falls within any of the hatched regions on the numerical scale shown in FIG. 11, then it is decided that there is a significant distortion, and if both T1 and T2 are outside the hatched regions, it is decided that there is no significant distortion.

For example, if the value of delta distance T is within the range of $1.5<T\leq 2.5$, it is decided that the distance is two modules long. In that range, the region of $1.5<T\leq 1.7$ and the region of $2.3<T\leq 2.5$ (hatched regions in the figure) are the regions inside which the data is judged as containing a significant distortion, and the region of $1.7<T\leq 2.3$ is the region inside which the data is judged as containing no significant distortion.

Generally, in the case of a structure of N modules, distortion is large, for example, when $(N-0.5)<T\leq(N-0.3)$ or $(N+0.3)<T\leq(N+0.5)$, and distortion is small when $(N-0.3)<T\leq(N+0.3)$.

When evaluating the distortion based on the lengths of adjacent characters i), a decision may be made that the adjacent character length check is rendered OK when $1.125\times cn>cn+1\geq 0.875\times cn$, of which $1.125\times cn>cn+1\geq 1.1$ cn and $0.9\times cn>cn+1\geq 0.875$ cn are judged as containing a significant deviation from the ideal specification value. Here, cn and cn+1 indicate adjacent character lengths (count values).

We claim:

1. An apparatus for reading a bar code consisting of a plurality of code blocks each representing a plurality of characters, comprising:

input means for inputting a code block;

demodulating means for demodulating from the input code block a prescribed number of characters out of the plurality of characters represented by said code block;

continuation deciding means for deciding whether to continue or discontinue demodulation, based on comparison between said prescribed number of characters demodulated by said demodulating means and characters demodulated before the input of the code block;

wherein said demodulating means further demodulates the remainder of the plurality of characters only when said continuation deciding means has decided that demodulation be continued.

2. An apparatus according to claim 1, wherein said code block is flanked by a center bar and a guard bar and said prescribed number of characters includes a character to be demodulated from a region adjacent to said guard bar.

3. An apparatus according to claim 2, wherein said continuation deciding means decides that demodulation be discontinued when demodulation has already been performed a specified number of times on the code block to which said prescribed number of demodulated characters belong.

4. An apparatus according to claim 2, wherein said continuation deciding means decides that demodulation be discontinued when demodulation free from significant distortion has already been performed on the code block to which said prescribed number of demodulated characters belong.

5. A method of reading a bar code consisting of a plurality of code blocks each representing a plurality of characters, comprising the steps of:

a) inputting a code block;

b) demodulating from the input code block a prescribed number of characters out of the plurality of characters represented by said code block;

c) deciding whether to continue or discontinue demodulation, based on comparison between said prescribed number of demodulated characters and characters demodulated before the code block input;

d) demodulating the remainder of said plurality of characters only when it is decided that demodulation be continued.

6. A method according to claim 5, wherein said code block is flanked by a center bar and a guard bar and said prescribed number of characters includes a character to be demodulated from a region adjacent to said guard bar.

7. A method according to claim 6, wherein in step c) it is decided that demodulation be discontinued when demodulation has already been performed a specified number of times on the code block to which said prescribed number of demodulated characters belong.

8. A method according to claim 6, wherein in step c) it is decided that demodulation be discontinued when demodulation free from significant distortion has already been performed on the code block to which said prescribed number of demodulated characters belong.

9. An apparatus for reading a bar code, comprising:

input means for inputting bar code data therefrom;

demodulation means for demodulating the bar code data character by character;

memory means for storing demodulated bar code data that is demodulated in advance to the bar code data;

comparison means for comparing a demodulated character and a character of the demodulated bar code data stored in the memory;

means for deciding whether to continue demodulation of the bar code data, based on the result made by the comparison means, the deciding means decide to discontinue a further demodulation of the bar code data if it is determined that a prescribed number of the demodulated characters of the bar code matches to the characters stored in the memory.

10. A method for demodulating bar code, comprising the steps of:

demodulating input bar code data character by character;

comparing demodulated character to a character of a demodulated bar code data in which is demodulated in advance of the input bar code data; and discontinuing further demodulation of the input bar code data when the prescribed number of the demodulated characters match to the character of the demodulated bar code consecutively.

* * * * *